United States Patent [19]

Strasser

[11] Patent Number: 5,598,656
[45] Date of Patent: Feb. 4, 1997

[54] INSULATED TIP-UP

[76] Inventor: Paul M. Strasser, C4148 Wiesman Rd., Stratford, Wis. 54458

[21] Appl. No.: 526,159

[22] Filed: Sep. 11, 1995

[51] Int. Cl.⁶ .................................................. A01K 97/12
[52] U.S. Cl. ................................................. 43/17; 43/57.1
[58] Field of Search ........................... 43/17, 4, 4.5, 57.1, 43/54.1

[56] References Cited

U.S. PATENT DOCUMENTS

| | | | |
|---|---|---|---|
| 3,025,852 | 3/1962 | Quilling | 43/4 |
| 3,387,401 | 6/1968 | Stelmach | 43/17 |
| 3,745,689 | 7/1973 | Williams | 43/17 |
| 4,131,107 | 12/1978 | Godbout | 126/271.2 R |
| 4,253,262 | 3/1981 | Johnson | 43/17 |
| 4,787,166 | 11/1988 | Vogt et al. | 43/17 |
| 4,845,878 | 7/1989 | Hackel | 43/17 |
| 4,945,688 | 8/1990 | Keller | 43/17 |
| 4,953,317 | 9/1990 | Ruchel | 43/17 |
| 4,995,577 | 2/1991 | Wood | 43/57.1 |
| 5,274,944 | 1/1994 | Laessig | 43/17 |
| 5,282,333 | 2/1994 | Klinkhamer | 43/4 |

*Primary Examiner*—Jeanne M. Elpel
*Attorney, Agent, or Firm*—Andrus, Sceales, Starke & Sawall

[57] ABSTRACT

An ice fishing tip-up which includes an insulating heating structure integrated with a fish indicator. The device is comprised of a four-walled enclosure which surrounds a heating element mounted on the interior. Contained within the enclosure is a fishing structure consisting of a rotatable shaft and a spool containing fishing line which is used to catch the fish. Connected to the exterior of the enclosure is a fish indicator which is connected at one end to the wall of the enclosure and engages the portion of the shaft extending to the exterior of the enclosure. With the heating element in place, a cover is placed over the top surface of the enclosure to retain heat within the enclosure and prevent the ice fishing hole from freezing over. When a fish strikes the fishing line, the shaft rotates and releases the fish indicator, signaling to the fisherman that a fish has been hooked.

9 Claims, 2 Drawing Sheets

INSULATED TIP-UP

BACKGROUND OF THE INVENTION

This invention relates to an ice fishing tip-up and more particularly to a tip-up with an integrated heating source and insulating structure for preventing the formation of ice in an ice fishing hole. When fishing in the winter, ice fishermen typically drill or cut a hole in the ice to fish in. To increase their chances of catching fish, ice fishermen typically use more than one hole to fish out of simultaneously. It is well known in the prior art to use a device called a "tip-up" to signal that a fish has struck the hook. A fisherman who is using a number of tip-ups is able to position himself in a stationary spot while monitoring several fishing holes located around him.

A major problem which the fisherman must deal with is preventing ice from forming in the fishing hole. If ice is allowed to form in the fishing hole, the line could be frozen in place, which would prevent the tip-up from indicating that a fish is on the hook, or the sharp edges of the ice could cut the fishing line when a fish strikes.

The prior art discloses a plurality of devices for attempting to keep ice from forming in an ice fishing hole. Godbout, U.S. Pat. No. 4,131,107 issued on Dec. 26, 1978, provides for a collapsible box containing a heat source and a hole contained in the cover for the fishing line. The Godbout device contains a bifurcated cover and a platform across the base for holding the heat source. The Godbout device requires a fisherman to continuously monitor his line, since there is no attached fish indicator.

Keller, U.S. Pat. No. 4,945,668 issued on Aug. 7, 1990, provides another method for keeping the ice fishing hole free of ice. In the device, the heating element rests on a closed bottom portion and uses several baffles to direct heat throughout the container. The fishing reel of the device is connected to the inside of the cover and, therefore, must be lifted out of the enclosure upon a fish strike.

In view of the prior art, it would be desirable to develop a more efficient means of insulating the area around an ice fishing hole, while providing a visual alerting signal to the fisherman that a fish has struck the bait.

SUMMARY OF THE INVENTION

In accordance with the present invention, an insulated fishing tip-up is provided which, when used as described, prevents a fishing hole in the ice from freezing over.

The insulated fishing tip-up of the present invention contains a rectangular four-walled enclosure. A cover is connected to the enclosure by a movable connector which permits the cover to move from an open to a closed position. In an open position, the cover allows access to the interior of the enclosure, while in the closed position, the cover engages the top portion of the enclosure to retain heat within the enclosure.

The insulating enclosure of the invention is completely open on the bottom and rests upon the ice surface. Connected to the interior of the enclosure is a hanging support. The hanging support is constructed to support a heating element, which can be removed and replaced by the fisherman.

The structure of the invention includes a rotatable shaft mounted across the interior of the enclosure and which rests upon notches which are removed portions of the enclosure on each of two parallel walls. Securely mounted near the middle of the shaft is a spool, which contains the fishing line. One end of the shaft extends through an open shaft notch, which is one of the removed sections of the enclosure, to a location outside of the enclosure. Since an open notch allows cold, outside air to enter the heated interior, insulating flaps are connected across the open notch of the enclosure to prevent a large amount of air flow in and out of the enclosure through this area.

A flexible elongated rod is provided which has a first and second end. The first end of the rod is securely fixed to the outside of the enclosure. A flag is affixed to the second end of the rod. The rod is movable from a first set position, whereby the second end of the rod is bent and maintained in position by the shaft at a location outside of the enclosure, to a second alert position whereby the rod is upright. The rod is responsive to an increase in tension in the fishing line. When a fish strikes, the fishing line unwinds from the spool, thereby rotating the shaft and releasing the rod from the set position to the alert position.

In another aspect of the invention, the cover of the enclosure includes a heat shield, which is mounted on the interior surface of the cover. The heat shield is placed at such a location so that when the cover is closed, the heat shield is located directly above the heating element. The heat shield of the invention is used to protect the cover and reflect heat towards the interior of the enclosure when the heating element is in operation.

A further objective of this invention is to provide an enclosure of small size and light weight for ease of transportation and storage. This is achieved by having the bottom of the enclosure completely open and the enclosure dimensions being only slightly larger than the diameter of the fishing hole. A further objective is to provide an enclosure which can easily and securely be stacked for efficient storage.

A method is also provided for insulating the area surrounding an ice fishing hole. The method is comprised of providing an insulating enclosure which has four walls connected in a rectangular shape and has a top and bottom surface. The insulating enclosure is then placed around the fishing hole in the ice. With the enclosure in place, a heating element is inserted into a hanging support connected to the interior of the enclosure. Once in place, the heating element is activated. A cover is then placed over the top portion of the enclosure to keep the heat inside. Within the enclosure is a heat shield, which is mounted on the interior surface of the cover, to both protect the cover from the heat given off by the heating element and to reflect the heat given off by the heating element back into the interior of the enclosure. A rotatable shaft and spool containing fishing line are connected across the interior of the enclosure. When a fish strikes a hook connected to the fishing line, the shaft rotates, which releases the flexible elongated rod from the first set position to a second alert position.

DETAILED DESCRIPTION OF THE DRAWINGS

Figure 1:
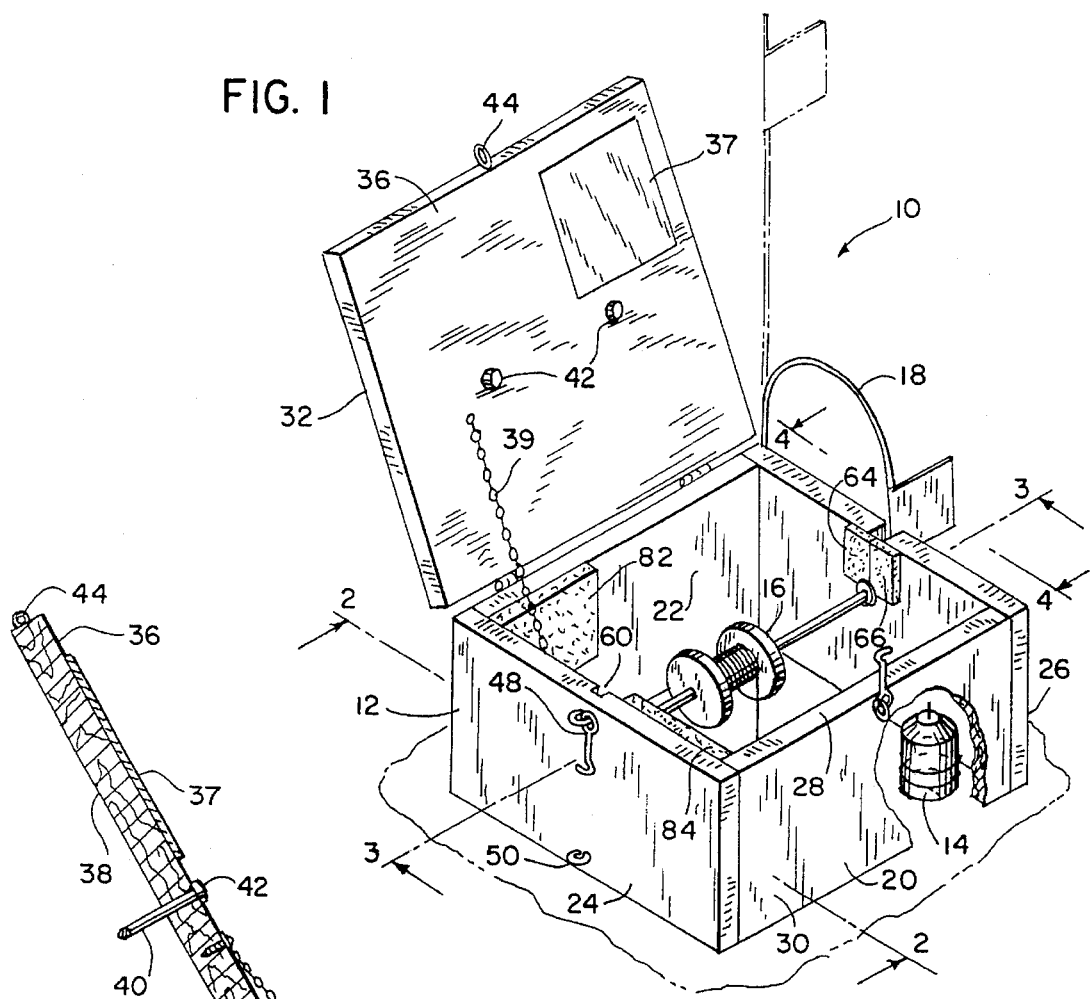
FIG. 1 is a perspective view of the invention with the cover in an open position and a section of the end wall cut away to show the heating element.

Referring to the drawings, and in particular FIG. 1, the insulated tip-up of this invention is generally indicated by reference numeral 10. The invention is comprised of an enclosure 12 surrounding a heating element 14, a fishing mechanism generally designated 16 and an indicator generally designated 18.

The enclosure 12 is formed of end walls 20,22 and side walls 24,26. In the shown preferred embodiment of the invention, the four walls of the enclosure 12 are preferably made of wood, and are connected in a substantially rectangular shape. It should be pointed out, however, that various embodiments of enclosure 12 are contemplated by the inventor, such as, but not limited to, an enclosure constructed of molded plastic or a circular-shaped enclosure replacing the rectangular shape shown in the figures. Each of these configurations are functionally equivalent and a matter of design choice. The enclosure 12 has a peripheral top edge surface 28 and a peripheral bottom edge surface 30 defining, respectfully, an open top and an open bottom.

Figure 2:
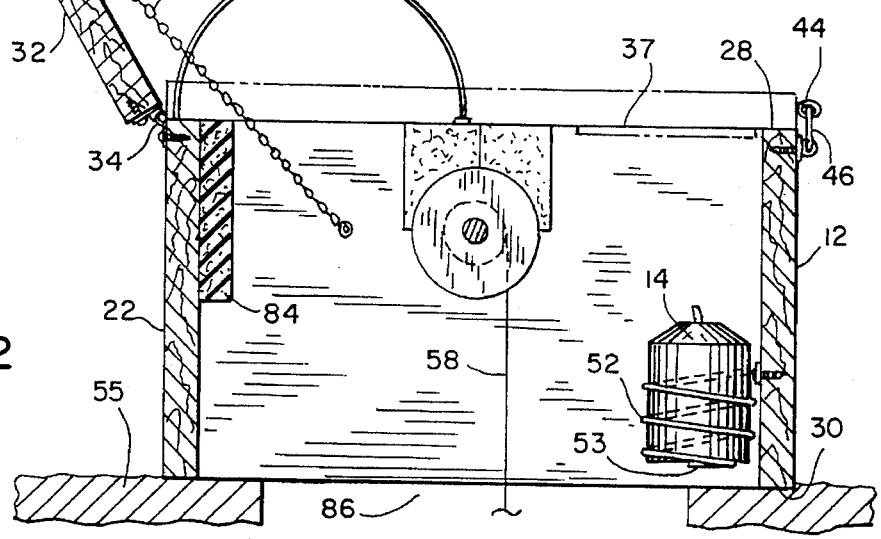
FIG. 2 is a sectional view along line 2—2 with the cover in an open position.

As can best be seen in FIG. 2, a cover 32 is attached to end wall 22 of enclosure 12. Cover 32 is attached to the enclosure 12 by a movable attachment means 34 to permit the cover to move from an open to a closed position, as shown by the phantom lines in FIG. 2.

In the preferred embodiment, the movable attachment means 34 are a pair of metal hinges attached to the cover 32 and end wall 22 with wood screws. It is understood that attachment means 34 could consist of a variety of configurations, such as nylon bands or plastic hinges, so long as the attachment means selected hold the cover in place and allow movement from an open to a closed position. Cover 32 consists of an interior surface 36 and an exterior surface 38, so that when cover 32 is in a closed position, interior surface 36 rests upon the top edge surface 28 of the enclosure 12. Chain 39 is attached from the interior surface 36 of the cover 32 to the interior surface of end wall 24 to limit the movement of cover 32 in its open position. With the cover in a closed position, chain 39 hangs loosely in the interior of enclosure 12, as shown in FIG. 3.

Affixed to the interior surface 36 of cover 32 is a heat shield 37. Heat shield 37 can be made of various materials, however, it should be made of a material which will protect the cover 32 from the heat given off by heating element 14. In the preferred embodiment, heat shield 37 is an aluminum plate, which not only protects the cover 32, but also reflects heat back into the interior of enclosure 12. As can best be seen in FIGS. 1 and 2, heat shield 37 is located on the interior cover surface 36 in such a manner that when cover 32 is in a closed position, heat shield 37 is directly above heating element 14 in order to provide the maximum protection.

Figure 3:
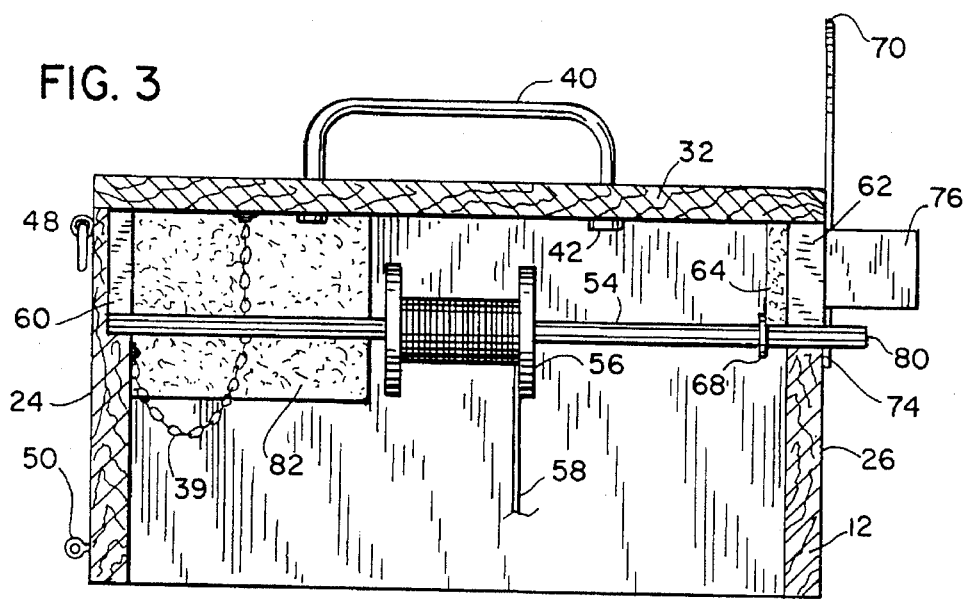
FIG. 3 is a sectional view along line 3—3 showing the fishing mechanism and the removed notches of the invention.

As can best be seen in FIG. 3, a handle 40 is connected through cover 32 to facilitate carrying of the entire enclosure 12. In the shown embodiment of the invention, the handle 40 is a bent piece of metal with welded stops 42 connected to the ends of the handle and engaging the interior surface 36 of cover 32 to securely hold the handle 40 in place. In an alternate embodiment of the invention, handle 40 consists of a braided nylon rope with knots replacing the welded connectors 42.

With the cover 32 in a closed position, a ring 44 and hook 46 are used to securely hold the cover in position, as shown in FIG. 2. Once the cover 32 is held in place as such, a fisherman can use the handle 40 to conveniently carry the entire structure with one hand.

A second hook 48 and ring 50 are also used in storage of the invention. For example, a second tip-up 10 may placed on top of a first tip-up with its cover closed and hook 46 and ring 44 joined. When stacked as such, hook 48 of the bottom tip-up is used to engage ring 50 of the upper tip-up to securely hold the stack. When stacked as such, handle 40 of the bottom tip-up extends through the open bottom of enclosure 12 of the tip-up stacked above it.

As can best be seen in FIGS. 1 and 2, heating element 14 is contained on the interior of enclosure 12. Heating element 14 is securely held above the bottom surface of the enclosure 14 by a hanging support 52, which is securely attached to any interior surface of the enclosure.

In the preferred embodiment, the hanging support 52 is a spiraled wire cage which is secured to the interior surface of end wall 20 by a wood screw. Hanging support 52 is constructed only slightly larger than heating element 14 so that it may securely hold heating element 14 while still allowing for easy removal by the fisherman. Hanging support 52 is connected at a point between the top surface 28 and bottom surface 30 of the enclosure 12 so that heating element 14 is held above the surface of the ice 55.

In the preferred embodiment, heating element 14 is a candle, although any device which emanates heat for an extended period of time could be used. With a candle being used as a heating element, the wire hanging support 52 allows melted wax from heating element 14 to drip through the open bottom surface 30 of the enclosure and onto the ice 55. The wire support 52 has a completely open bottom, except for a candle support member 53, which is the endpiece of the support 52 bent toward the axial center of the support structure.

Fishing mechanism 16 consists of shaft 54, a spool 56 and fishing line 58. As can best be seen in FIG. 3, the shaft 54 extends between side wall 24 and side wall 26 of enclosure 12. The first end of shaft 54 rests on the bottom of a blind shaft notch 60 formed by material partially removed from side wall 24. The second end of shaft 54 extends through an open shaft notch 62 formed by material completely removed from the opposite side wall 26. Shaft 54 extends completely through open notch 62 and extends into the exterior of enclosure 12. Connected across the open shaft notch 62 are two flaps of insulating material 64 and 66, which limit the air flow through the notch and hold the shaft in position. Shaft 54 also contains a washer 68, which additionally helps to limit the longitudinal movement of shaft 54. Since shaft 54 merely rests on the bottom of notches 60 and 62, it is able to freely rotate about its axis.

Securely mounted onto shaft 54 is a spool 56 which contains the fishing line 58. In use, fishing line 58 is connected to a baited hook and extends down into the water. When a fish strikes the baited hook, the line 58 realizes an increase in tension. This increase in tension causes spool 56, and hence shaft 54, to rotate as the arrows of FIG. 4 indicate.

Since the combination of shaft 54 and spool 56 is not fixed within the enclosure 12, it can easily and quickly be replaced by the fisherman depending on the type of fish being pursued. For example, if the fisherman is initially fishing for large fish, such as northern pike, he will typically use a relatively heavy line. If he then decides to fish for smaller fish, such as perch, he is able to remove the shaft and spool combination and replace them with a shaft and spool containing lighter weight line in a matter of seconds.

Indicator 18 consists of an elongated flexible rod 70 having a first end 72, a second end 74, and a flag 76 securely attached to its second end. As can best be seen by FIG. 4, the first end of the flexible rod 72 is securely attached to the exterior of side wall 26. While this attachment could be done in any number of ways, in the preferred embodiment, mounting brackets 78 are screwed into the wood side wall 26. As shown in FIG. 3, the second end 74 of the elongated rod 70 engages the extended portion 80 of shaft 54 to hold the elongated rod 70 in a set position.

Figure 4:
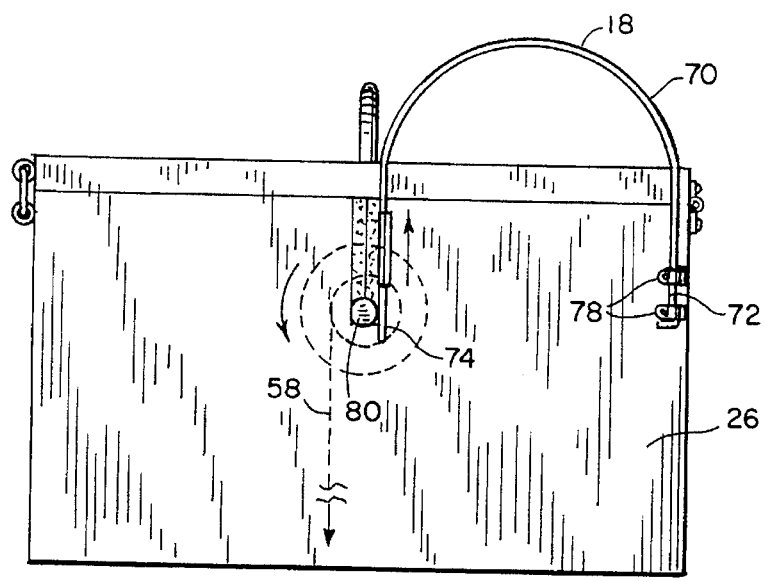
FIG. 4 is a side view of the invention with phantom lines showing the direction of operation of the fishing mechanism.
Figure 5:
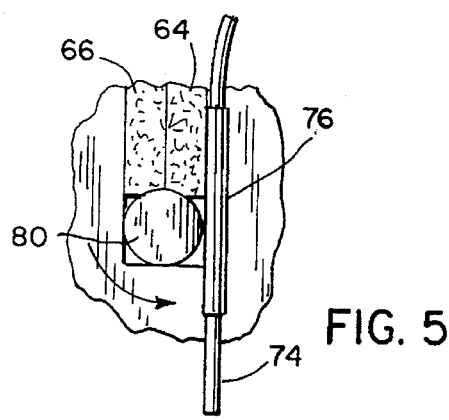
FIG. 5 is an enlarged view of FIG. 4 showing the relationship between the indicator and the rotatable shaft of the invention.

As shown by the arrows in FIGS. 4 and 5, the rotation of spool 56 causes shaft 54 to rotate. The rotation of shaft 54, in turn, causes the second end 74 of rod 70 to release upward, as shown by the arrows. The released rod 70 returns to its erect, alert position depicted by the phantom lines in FIG. 1.

In the preferred embodiment of the invention, foam bait holders 82 and 84 are mounted onto the interior of enclosure 12. These bait holders 82,84 are used to secure fishing tackle, such as jig heads or hooks, when they are not being used for fishing.

As can best be seen in FIG. 2, the enclosure 12 with a completely open bottom as define by edge surface 30, is placed over a hole in the ice 86. The interior dimensions of enclosure 12 must therefore be larger than the diameter of the hole 86 in the ice. In the preferred embodiment of the invention, the interior dimension of enclosure 12 are approximately 12 inches in each direction, while the diameter of hole 86 is typically in the range of 6 to 10 inches. It is well understood that the interior dimensions of enclosure 12 can easily be modified without changing the invention to accommodate ice fishing holes 86 which are smaller or larger than shown in the preferred embodiment.

I claim:

1. An insulated fishing tip-up comprising:

an enclosure having two opposing end walls and two opposing side walls, said side walls and said end walls joined to form a rectangular enclosure, said enclosure having an open top and bottom surface;

a cover having an interior and exterior surface, said cover movably attached to said enclosure, said cover movable from an open to a closed position wherein said cover rests upon said top surface of said enclosure;

a hanging support securely mounted to the interior of said enclosure;

a heating element, said heating element supported by said hanging support above the bottom surface of said enclosure;

a heat shield affixed to the interior surface of said cover, said heat shield positioned above said heating element when said cover is in a closed position;

a shaft notch, said shaft notch being a removed portion of one said side wall of said enclosure;

a shaft mounted between said side walls, said shaft having a portion extending through said shaft notch to a location on the exterior of said enclosure, said shaft being so mounted to allow free rotation;

insulating flaps affixed to the interior of said enclosure, said insulating flaps located across said shaft notch for use as an insulator to limit air flow into said enclosure;

a spool containing fishing line, said spool being mounted on said shaft;

an elongated flexible rod having a first and second end, said first end securely attached to the exterior of said enclosure and said second end movable from a first set position, wherein said second end is held by the extended portion of said shaft, to a second upright, alert position upon an increase in tension in said fishing line;

a flag affixed to said second end of said elongated flexible rod.

2. An insulated fishing tip-up as set forth in claim 1, wherein said hanging support is a spiraled wire cage having an open bottom portion.

3. An insulated fishing tip-up as set forth in claim 1, wherein said heating element is a candle.

4. An insulated fishing tip-up as set forth in claim 1, further comprising a handle, said handle being securely connected through said cover, said handle to be used in transporting the tip-up.

5. An insulated fishing tip-up as set forth in claim 1, further comprising a pair of hook and rings, said first hook and ring used to secure said cover to said enclosure and said second hook and ring used to secure a first tip-up to a second tip-up stacked above it.

6. An insulated fishing tip-up comprising:

an enclosure having a top cover member and an open bottom, said cover member connected by a movable connecting means to said enclosure;

means for heating the interior of said enclosure;

a rotatable shaft demountably attached across the interior of said enclosure, a portion of said shaft extending through a shaft notch contained in said enclosure to the exterior of said enclosure;

insulating flap affixed to said enclosure, said insulating flaps located across said shaft notch for use as an insulator to limit air flow into said enclosure:

a spool containing fishing line, said spool being securely mounted on said shaft for rotation therewith and;

a signal means for indicating an increase in tension in said fishing line.

7. The insulated fishing tip-up as set forth in claim 6, wherein said rotatable shaft, said mounted spool and said fishing line are constructed in such a manner as to form a single fishing mechanism, said fishing mechanism being selectively removable from said enclosure for replacement by another fishing mechanism.

8. The insulated fishing tip-up as set forth in claim 6, wherein said signal means includes means in operative engagement with said shaft and responsive to rotation thereof.

9. The insulated fishing tip-up as set forth in claim 6, wherein said signal means comprises an elongated flexible rod having first and second ends, said rod movable from a first set position to a second alert position; and a flag affixed to said elongated rod for indicating said alert position.

* * * * *